United States Patent

[11] 3,594,733

[72] Inventor George B. Lukens, II
Waynesboro, Va.
[21] Appl. No. 801,557
[22] Filed Feb. 24, 1969
[45] Patented July 20, 1971
[73] Assignee General electric Company

[54] DIGITAL PULSE STRETCHER
11 Claims, 4 Drawing Figs.

[52] U.S. Cl. .................... 340/172.5, 328/110, 328/63
[51] Int. Cl. .................... G06f 13/02, G06f 1/04
[50] Field of Search .................... 34/172.5; 328/63, 72, 179, 110; 307/208, 269

[56] References Cited

UNITED STATES PATENTS

| | | | |
|---|---|---|---|
| 2,830,179 | 4/1958 | Stenning | 328/110 X |
| 3,064,241 | 11/1962 | Schneider | 340/172.5 X |
| 3,107,344 | 10/1963 | Baker et al. | 340/172.5 X |
| 3,443,070 | 5/1969 | Derby et al. | 328/63 X |

*Primary Examiner*—Paul J. Henon
*Assistant Examiner*—Paul R. Woods
*Attorneys*—Joseph B. Forman, William S. Wolfe, Frank L. Neuhauser, Oscar B. Waddell and Gerald R. Woods

ABSTRACT: A digital signal processing arrangement involving pulse forming and timing. A digital pulse stretcher synchronizes the output of an asynchronous pulse source with a synchronous digital frequency source. The pulse stretcher includes a first flip-flop which is set until the asynchronous pulse arrives. Arrival of the asynchronous pulse resets the first flip-flop and simultaneously sets a second flip-flop. A third flip-flop is set until the synchronous pulse arrives at which time the third flip-flop resets. As the end of the synchronous pulse the second flip-flop resets, causing the third flip-flop to return to the set state. A triggered output flip-flop is also included and operates to release the output of the second flip-flop at the beginning of the next bit time.

INVENTOR.
GEORGE B. LUKENS, II
BY Michael Masnik
HIS ATTORNEY

INVENTOR.
GEORGE B. LUKENS, II
BY Michael Masnik
HIS ATTORNEY

DIGITAL PULSE STRETCHER

BACKGROUND OF THE INVENTION

The present invention relates to systems for serially processing digital data. More specifically, the invention relates to digital pulse forming and timing for synchronizing a recirculating data storage loop.

Data processing systems of the serial storage type are well know. In such systems, digital data is stored in a recirculating storage loop. The circulating loop includes means for entering, changing and removing data from the storage loop. Arithmetic operations may be performed by removing the data from the storage loop and transferring it to separate arithmetic units where the requisite arithmetic calculations take place. Following these calculations, the new data is reentered into the circulating loop.

In other types of serial data processing systems, the arithmetic unit forms a part of the recirculating storage loop and the arithmetic operations are performed as the data circulates through the loop.

In either type of system, it is necessary to continuously synchronize the circulation of data so as to assure proper operation of the processing system. Such synchronization is generally times by a master clock source which generates pulses of a fixed frequency. The pulses from the clock are fed throughout the data processing system so that all units operate in synchronism.

The problem of synchronization in such systems depends, in large part, upon the type of storage unit which is used to store the majority of the data in the recirculating loop. This storage unit may comprise a shift register through which data circulates in response to pulses from the master clock. Such a system is inherently synchronous since the rate at which the data circulates through the register is controlled by the master clock.

In other systems, however, the main storage unit may comprise some means for asynchronously circulating the data such as a rotating magnetic drum or an electroacoustic delay line. In such systems, the rate at which the data circulates in independent of the master clock. In the case of drum storage, the circulation rate depends upon the speed of drum rotation. Similarily, the rate at which the data circulates through an electroacoustic delay line is a function of the construction and material of the delay line, temperature, etc. In both cases it is apparent that data coming out of the main storage unit may require synchronization before it can be utilized.

The problem of synchronization has, however, been alleviated somewhat by recent advances in the manufacture of asynchronous storage devices, particularly delay lines. The amount of variation in circulation time was formerly so great as to require some way of identifying the circulating data such as separate "identification" bits which were circulated along with the data. With recent advances in the development of delay lines, it is now possible to manufacture such devices to tolerances which assure that the variation in circulating time will not exceed a fraction of the amount of time allocated to each bit of data. That is, the variation will not exceed one "bit time".

While these developments have somewhat alleviated the problem of synchronization, the necessity for synchronization remains because of slight changes which may occur due to other factors such as temperature variations, etc. In addition, while the amount of variation per circulation may be quite small, such variations accumulate with each circulation and must, therefore, be accounted for.

A known technique for synchronizing the output of such as asynchronous storage unit utilizes a device referred to broadly as a "pulse stretcher". A pulse stretcher receives the individual data pulses as they are circulated out of the storage unit and then releases them in synchronism with the master clock. In this way, the data can be properly presented to arithmetic units, etc. and any variations in circulating time are compensated for during each circulation of data. In this way, synchronous operation is assured and slight variations do not accumulate.

The problem of synchronization with such devices is really a twofold problem. First, it is difficult to construct such asynchronous delay devices so that the amount of delay is a precise multiple of the master clock rate. That is, the master clock is 5 MHz, each bit of data occupies one clock time or 200 nanoseconds. If the storage device is to store 100 bits of data, every bit entered into the device should exit precisely 20 microseconds (200 nanoseconds/bit X 100 bits) later. Rather than exiting at precisely this time, a commercial device is constructed so as to assure that the delay will be 20 microseconds plus or minus some given tolerance which is generally less than one bit time. Hence, it is necessary to "trim" the output of the storage unit to some integral number of bit times.

In addition to the need to "trim" the output, such delay devices are also subject to slight variations in delay time which result from changes in temperature, etc. While the amount of individual variation may not be particularly troublesome, these variations accumulate when the storage device forms part of a recirculating storage loop and this accumulation can ultimately lead to loss of synchronization. It should be noted that the problem of cumulative variations is not solely due to variations in the main storage unit. Glass delay lines, for example, can be constructed so as to exhibit minimal variation especially when used in a closely controlled environment. However, the storage unit itself forms only a part of the recirculating storage loop which includes amplifiers, logic elements, etc. which are often much more susceptible to variations than the line itself. Thus, even when the main storage unit is free from such difficulties, the storage loop may well contain other elements which require the use of some type of pulse stretcher.

Prior art attempts to solve these problems have included the use of additional, adjustable delay devices which are connected to the output of the main storage unit and then adjusted to "trim" the delay to an integral number of bit times. While this approach is nominally successful for trimming, it does not take care of the second type of difficulties mentioned above, i.e., cumulative variations.

A still further approach to this problem has been the use of active logic elements which receive the output of the delay line and then release it in synchronism with the master clock. One such system utilizes two bistable devices such as flip-flops. The first flip-flop is set by the output of the main storage unit and remains set until the master clock signal arrives at which time the second flip-flop sets which in turn resets the first. Such a pulse stretcher has, however, a limited range and cannot be used to synchronize the output of the main storage unit if that output arrives shortly after the clock signal. This is true because there is a finite time required after arrival of the clock pulse to set the second flip-flop and reset the first. If the output of the main storage unit arrives during this time it will be missed since the first flip-flop will not have reset as is required in order to be ready to set in response to an output from the main storage unit. Such a system, therefore, has a limited capture band.

SUMMARY OF THE INVENTION

It is an object of this invention to provide an improved signal processing arrangement.

It is an object of the present invention to provide an arrangement for synchronizing the output of an asynchronous storage device.

It is a further object of the present invention to provide a pulse stretcher which operates to trim the output of an asynchronous storage unit while simultaneously protecting against accumulation of variations in circulating time.

It is a still further object of the present invention to compensate for delays resulting from devices within the circulating loop but outside of the main storage unit.

It is a still further object of the present invention to provide a pulse stretcher which has an increased capture band.

Briefly, in accordance with one embodiment of the present invention there are provided a plurality of bistable devices which receive pulses from an asynchronous storage unit, stretch each pulse so as to synchronize them with a synchronous pulse source and then release each pulse in synchronism with the synchronous pulse source.

BRIEF DESCRIPTION OF THE DRAWINGS

While the specification concludes with claims particularly pointing out and distinctly claiming the subject matter which is regarded as the present invention, an illustration of a particular embodiment can be seen by referring to the specification in connection with the accompanying drawings in which:

DESCRIPTION OF THE PREFERRED EMBODIMENT

Figure 1:
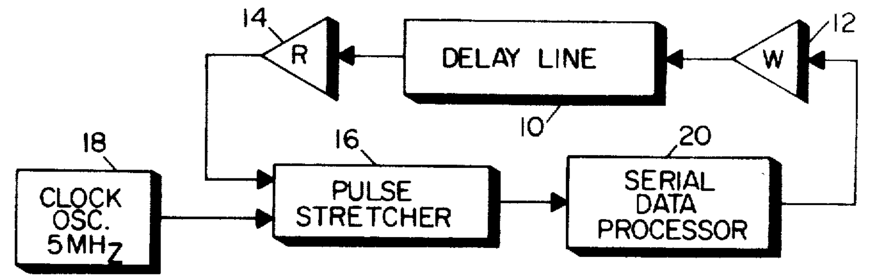
FIG. 1 is a block diagram of a data processing system which utilizes a pulse stretcher of the type comprising the present invention.

FIG. 1 is a block diagram of a data processing system utilizing a pulse stretcher of the type comprising the present invention. Data is stored in this system in an asynchronous storage unit such as a delay line 10. Data enters the delay line 10 by means of a Write amplifier 12 and exits the delay line via a Read amplifier 14. Data which comes out of the Read amplifier 14 is first passed through a pulse stretcher 16 which synchronizes the data with a clock oscillator 18. The synchronized data which comes out of the pulse stretcher 16 is then fed to some type of serial data processor 20 for performing the necessary arithmetic functions, etc. before reentering the data on the delay line by way of Write amplifier 12.

Such data systems are, in general, well known in the art. The main data storage unit is the delay line 10 which continuously circulates data presented at its input from Write amplifier 12 to its output feeding Reed amplifier 14. Thus, the system of FIG. 1 is a recirculating data storage system in which the data continuously circulates in and out of an asynchronous storage unit such as the delay line 10 and is continually processed during circulation by some type of a serial data processor 20.

Systems of this type have a finite storage limit which includes the storage capabilities of the delay line 10, the pulse stretcher 16, and the serial data processor 20. Therefore, if the system has a capacity of say 600 bits, the delay line may have the capability of storing 594 bits, the pulse stretcher 1 bit and the serial data processor 20 and other logic elements a capacity of 5 bits.

As was pointed out above, the delay line 10 may not provide precisely 594 bits of delay under all conditions. In the first place, it is not practically feasible to construct commercial delay lines which have precisely the amount of delay desired. Hence, a pulse (representing one bit of data) which is entered on the input of delay line 10 may exit from the delay line 10 a few nanoseconds more or less than 594 bit times. In addition to the inherent tolerance of the delay line 10, the delay time may vary with changes in environment conditions, particularly changes in temperature.

The delay line 10 is not the only source of possible variations in the circulating loop. Thus, the amount of delay of the logic elements comprising pulse stretcher 16 and serial data processor 20 may continue to the delay time of the system and may vary with environmental conditions. Finally, a more likely source of such variations occurs in the Read amplifier 14 and the Write amplifier 12. It is clear, therefore, that it is necessary to furnish a pulse stretcher 16 which has two capabilities. The pulse stretcher 16 must first trim the output of the delay line 10 to an integral number of bit times. In addition, a pulse stretcher 16 must operate in such a fashion as to prevent the accumulation of variations which would, after a number of circulations, throw the data processing system out of synchronization.

Figure 2:
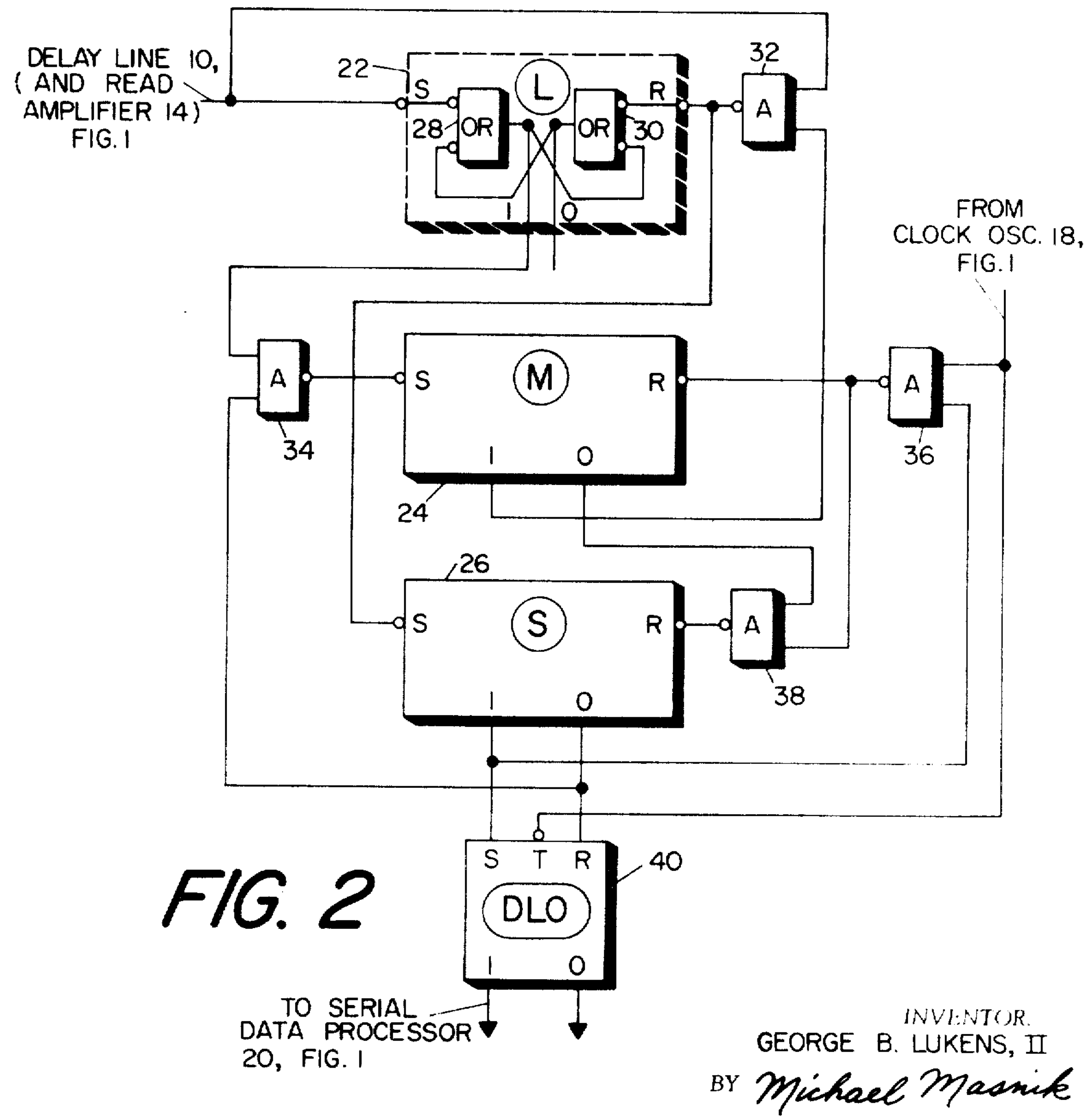
FIG. 2 is a detailed logic diagram of a preferred embodiment of the pulse stretcher comprising the present invention; and, FIGS. 3 and 4 are timing diagrams illustrating the operation of the pulse stretcher of FIG. 2.

The detailed logic diagram of FIG. 2 reveals a preferred embodiment of a pulse stretcher which has an improved band width and which acts to trim the output of the asynchronous storage unit to an integral number of bits while simultaneously preventing the accumulation of variations in circulation time.

The present pulse stretcher is a digital device which operates from signals which represent one of two discrete logic levels. The first logic level is referred to as logic "0" and is generally a low voltage. The other logic level is referred to as logic "1" and is ordinarily a higher voltage level than that used to represent a logic "0" signal. Throughout the present description, voltage levels will not be used but instead the signals will be referred to as comprising one of the two possible logic levels.

The pulse stretcher of FIG. 2 includes several logic elements which will be described briefly. The first logic element used is a NAND gate represented in this figure in two different fashions as illustrated by NAND gate 28 and NAND gate 32. While both of these elements are operationally identical, their function in the particular circuit is indicated by labeling them either "OR" or "A" (for and). These NAND gates will have a logic "0" at their output terminal when all of the signals on their input terminals are logic "1." Under all other conditions, the output of these NAND gates will be a logic "1."

The present invention utilizes three flip-flops which comprise two interconnected NAND gates as illustrated by flip-flop 22 made up of NAND gates 28 and 30. The output of NAND gate 28 forms one of the inputs to NAND gate 30 whereas the output of NAND gate 30 forms one of the inputs to NAND gate 28. The other input to NAND gate 28 is labeled the "S" (set) input terminal whereas the second input to NAND gate 30 is labeled the "R" (reset) input terminal. The flip-flop outputs come from the outputs of the two NAND gates, the output of NAND gate 30 being the "0" output while the output of NAND gate 28 is the "1" output terminal. The labels on these output terminals indicate the logic signal present at the terminal when the flip-flop is in its set state. Since flip-flops 24 and 26 are identical in construction and operation to flip-flop 22 they are not shown in detail in FIG. 2.

The other logic symbol used in FIG. 2 is illustrated by the flip-flop 40. This is a conventional J-K flip-flop. In this type of flip-flop, the two steering terminals labeled "S" and "R" determine the state which the flip-flop will assume the next time the signal at its trigger input "T" goes to a logic "0." That is, if the "S" input goes to logic "1," the flip-flop will assume the set state the next time the signal on the trigger input terminal "T" goes to logic "0." Similarly, if the signal on the "R" input terminal is a logic "1," the flip-flop will assume the reset state the next time the signal on the "T" terminal goes to logic "0."

As was true in the case of flip-flops 22, 24, and 26, the outputs of flip-flop 40 are labeled "0" and "1" to indicate the logic signal present at those outputs when the flip-flop is in its set state.

The pulse stretcher of FIG. 2 consists of three bistable storage devices such as flip-flops 22, 24 and 26. As described hereinbefore, flip-flop 22 is illustrated as consisting of two NAND gates 28, 30 with the understanding that flip-flops 24 and 26 can be similarly constructed. The output of the delay line 10 is connected to the "S" input terminal of flip-flop 22. The "R" input terminal of flip-flop 22 is connected to the output of a NAND gate 32. The output of the delay line 10 also forms one of the inputs to NAND gate 32, its other input being connected to the "1" output of the M flip-flop 24.

The "1" output of the L flip-flop 22 forms one input to a NAND gate 34 whose output is connected to the "S" input terminal of the M flip-flop 24. The other input to NAND gate 34 comes from the "0" output of the S flip-flop 26. The "R" input terminal of the M flip-flop 24 is connected to the output of a NAND gate 36. One of the inputs to NAND gate 36 comes from the clock oscillator 18 of FIG. 1. The other input to NAND gate 36 is connected to the "1" output of the S flip-flop 26.

The "S" input of the S flip-flop 26 is connected to the output of NAND gate 32. The "R" input terminal of the S flip-flop 26 is connected to the output of a NAND gate 38. NAND gate 38 has one of its inputs connected to the "0" output of the M flip-flop 24 while the other input is connected to the output of NAND gate 36.

These three bistable storage units and their interconnecting elements comprise a basic pulse stretcher which is a preferred embodiment of the present invention. In addition to the basic pulse stretcher, there is also provided a steered flip-flop 40 which is steered by the output of the pulse stretcher and acts to generate the output pulses delayed until the next bit time for use in the serial data processor 20 of FIG. 1. For this reason, the "1" output of the S flip-flop 26 is connected to the "S" input terminal of DLO flip-flop 40. The "0" output of the S flip-flop 26 is connected to the "R" input of DLO flip-flop 40. These connections are, as pointed out above, the steering terminals. The steered flip-flop 40 is then triggered by the clock oscillator 18 by virtue of its connection to the "T" terminal of the DLO flip-flop 40.

The operation of the pulse stretcher of FIG. 2 can best be explained by reference to the waveforms of FIGS. 3 and 4. In these waveforms, the various signals in the circuit as shown going from a low voltage level, labeled "0," to a higher voltage level labeled "1." It will be apparent that the absolute voltage levels in such a digital system are not important. Hence, for the sake of convenience, a signal will be referred to as a logic "0" if it is in the lower voltage level and referred to as a logic "1" if it is the higher voltage level.

Figure 3:
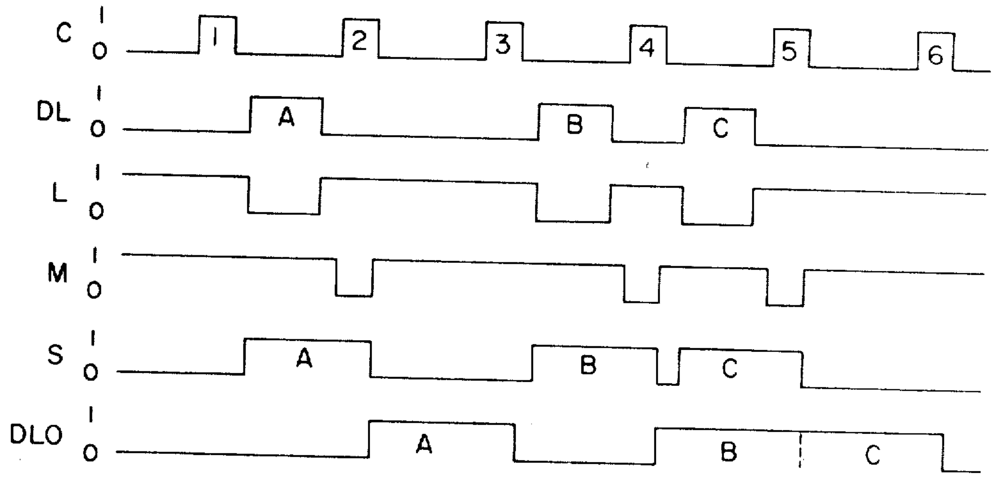
Figure 4:
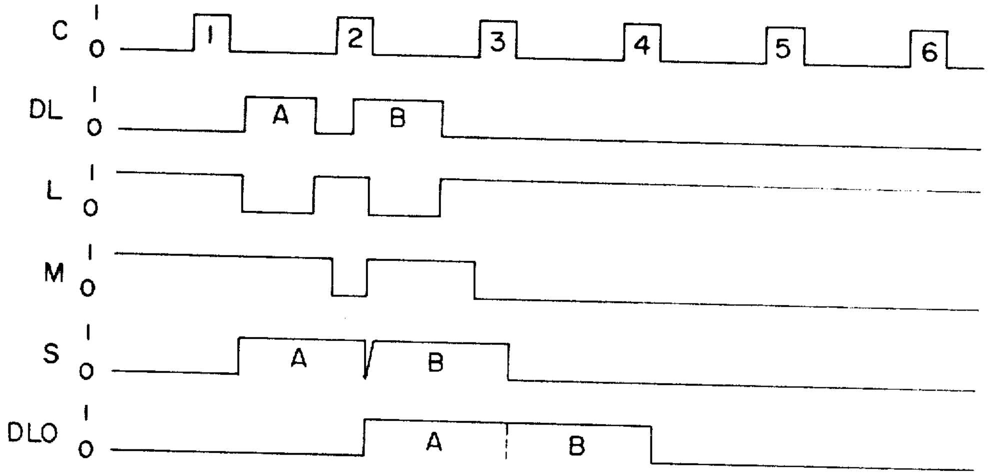

The waveforms in FIGS. 3 and 4 are labeled with respect to the device of signal which they represent. The waveform labeled "C" indicates the output of the clock oscillator 18 from FIG. 1. The frequency of clock oscillator 18 of FIG. 1 may be, for example, 5 megahertz in which case the clock pulses have a period of 200 nanoseconds. The waveform labeled "DL" indicates the signal from the delay line 10, after it has passed through Read amplifier 14.

The signals labeled "L," "M," "S," and "DLO" represent the state of the identically labeled flip-flops of FIG. 2. That is, if the L flip-flop 22 of FIG. 2 is set, the waveform labeled "L" will be shown in the logic "1" position.

In FIG. 3, the clock pulses are shown and identified with numbers so as to facilitate this explanation. Ideally, the pulses from the delay line (indicated by the waveform "DL") should be approximately one-half the period of the clock and should enter the pulse stretcher centered between the clock pulses. Hence, if the clock is 5 megahertz, then the period of the clock pulses is 200 nanoseconds and the output of the delay line should be a pulse approximately 100 nanoseconds wide occuring at the position shown by the pulse A in FIG. 3.

Prior to the arrival of a pulse from the delay line, the L flip-flop 22 will be set, the M flip-flop 24 will be set and the S flip-flop 26 will be reset. As will be seen, the purpose of the pulse stretcher is to stretch the pulses arriving from the delay line and synchronize them with the clock pulses. The pulse stretcher of the present invention will achieve this purpose by setting the S flip-flop 26 when a pulse arrives from the delay line and holding the S flip-flop set until the next clock pulse goes from logic "1" to logic "0."

When the pulse labeled A is received from the delay line, the L flip-flop 22 immediately resets by virtue of the fact that the M flip-flop is set so as to cause the output of gate 32 to go to a logic "0" when the output of the delay line goes to logic "1." The output of gate 32 resets the L flip-flop 22 by virtue of its connection to the "R" input terminal of flip-flop 22. The output of gate 32 is also connected to the "S" input of flip-flop 26 so that the "S" flip-flop sets at this same time. When the output of the delay line goes to logic "0" the L flip-flop 22 will set since the output of the delay line is connected directly to the "S" input terminal of the L flip-flop 22. The S flip-flop 26, however, remains set after the delay line output goes to logic "O."

Since the S flip-flop 26 is set, the M flip-flop 24 will reset the next time the clock signal goes to logic "1." This is true because the output of gate 36 is connected to the "R" input of the M flip-flop 24. When the clock pulse goes from logic "1" to logic "0" the output of gate 36 returns to the logic "1" state. Since this output forms one input to gate 38 and since the "0" output of M flip-flop 24 forms the other input to gate 38, the S flip-flop 26 will be reset by virtue of the connection of the output of gate 38 to the "R" input terminal of the S flip-flop 26.

From the foregoing, it can be seen that the incoming clock pulse A has been stretched so as to remain until the next clock pulse goes to logic "0."

Since the "1" output of the S flip-flop 26 is connected to the set steering terminal "S" of the DLO flip-flop 40, the DLO flip-flop 40 will set at the same time the S flip-flop 26 resets since the clock signal forms the trigger input "T" to the DLO flip-flop 40. The output of the DLO flip-flop 40 is then a synchronous pulse, one clock period wide, delayed so as to occur during the next succeeding bit time following the arrival of the output pulse from the delay line.

FIG. 3 also shows the operation of the present pulse stretcher when it receives two successive pulses indicated B and C. As can be seen, each of these pulses is similarly stretched so that the DLO flip-flop 40 remains set for two consecutive bit times.

If the output of the delay line occurs as shown in FIG. 3, the devices of the known prior art may operate satisfactorily since the master flip-flop M has ample time to receive successive outputs of the delay line. However, since prior art devices will not work satisfactorily if the output of the delay line arrives too near the time when the clock output goes to logic "0." This is true because the M flip-flop will not have adequate time to assume the set state before the output of the delay line arrives. The present invention, however, overcomes the difficulties of the prior art in this regard since the use of a latch flip-flop L, as well as the master flip-flop M, protects against missing a pulse from the delay line which occurs in the vicinity of the time when the clock output goes to a logic "O." Such a situation is illustrated in the waveforms of FIG. 4.

As described above with regard to FIG. 3, the operation of the pulse stretcher upon receipt of the pulse labeled A in FIG. 4 is clear. However, the pulse labeled B is shown arriving before the M flip-flop 24 has an opportunity to assume the set state. While the present illustration shows the pulse B arriving prior to the time the clock output actually goes to logic "0," it is clear that the operation is the same, and the advantages of the invention are the same, when a pulse arrives from the delay line either shortly before or shortly after the time when the output of the clock goes to logic "0."

When the pulse labeled B is received from the delay line, the L flip-flop 22 does not set (as it ordinarily would) because the M flip-flop 24 is still in the reset state. In the reset state, the "1" output of the M flip-flop 24 is a logic "0" so that the gate 32 does not cause the L flip-flop 22 to reset until after the M flip-flop 24 once again assumes the set state. In this fashion, the pulse stretcher of the present invention prevents missing pulses from the delay line which would ordinarily be missed because the M flip-flop 24 had not yet assumed the set state. As shown in FIG. 4, the S flip-flop 26 resets momentarily when the M flip-flop 24 sets. However, since the L flip-flop 22 will reset as soon as the M flip-flop 24 sets, the S flip-flop 26 will, after a slight delay due to logic switching time, also return to the set state as shown by the representation of the B pulse in the "S" waveform of FIG. 4.

Finally, referring to the "DLO" waveform of FIG. 4, it can be seen that the pulse stretcher of the present invention has operated completely satisfactorily so as to provide the necessary output pulses despite the fact that the input pulse from the delay line were located in such a way as to preclude their having been properly handled by pulse stretchers of the known prior art.

Although the present invention has been described with respect to a particular embodiment, the principles underlining this invention will suggest many additional modifications of this particular embodiment to those skilled in the art. Therefore, it is intended that the appended claims shall not be limited to the specific embodiment, but rather shall cover all such modifications as fall within the true spirit and scope of the present invention.

What I claim as new and desired to be secured by Letters Patent of the United States is:

1. A pulse stretcher for delaying and synchronizing a digital input input pulse comprising;
an asynchronous pulse source for generating the digital pulse to be synchronized;
a synchronous digital pulse frequency source to which the digital input pulse is to be synchronized;
first, second and third bistable devices;
means for operatively connecting said asynchronous pulse source to said first bistable device;
means for operatively connecting said synchronous digital pulse source to said second bistable device; and,
means for connecting said first and second bistable devices to said third bistable device whereby said third bistable device assumes a first state in response to the condition of said first bistable device and remains in said first state until changed by said second bistable device.

2. The pulse stretcher as recited in claim 1 further comprising a fourth bistable device operatively connected to said third bistable device and to said synchronous pulse source, said fourth bistable device being operative to assume a first state in response to the state of third bistable device and remain in said first state until the first pulse from said synchronous pulse source following a change in the state of said third bistable device.

3. The pulse stretcher recited in claim 1 wherein said asynchronous pulse source is an asynchronous circulating storage unit.

4. The pulse stretcher as recited in claim 3 wherein said asynchronous circulating storage unit comprises a delay line.

5. A serial data storage and processing system comprising:
an asynchronous circulating circulating storage unit;
a synchronous digital pulse frequency source;
a pulse stretcher operatively connected to said asynchronous storage unit and said synchronous pulse source, said pulse stretcher including first, second, and third bistable devices operative to receive the outputs of said asynchronous storage unit and said synchronous pulse source so as to delay and synchronize the output of said asynchronous storage with the output of said synchronous pulse source;
a serial data processor operatively connected to receive the output of said pulse stretcher; and
means for connecting the output of said pulse stretcher to the input of said asynchronous storage unit.

6. The serial data storage and processing system recited in claim 5 wherein said asynchronous circulating storage unit comprises a delay line.

7. A pulse stretcher for delaying and synchronizing a digital input pulse comprising:
an asynchronous pulse source for generating the digital pulse to be synchronized;
first, second, and third flip-flops, each having a set input terminal, a reset input terminal, a first output terminal for indicating when said flip-flop is set and a second output terminal for indicating when said flip-flop is reset;
means for connecting the output of said asynchronous pulse source to said set input terminal of said first flip-flop;
a first logic gate having its inputs connected to said asynchronous pulse source and to said first output terminal of said second flip-flop, the output of said first gate being connected to said reset input terminal of said first flip-flop and to said set input terminal of said third flip-flop;
a second logic gate having its inputs connected to said first output of said first flip-flop and to said second input of said third flip-flop and its output connected to said set input terminal of said second flip-flop;
a third logic gate having its inputs connected to said synchronous pulse source and to said first output of said third flip-flop and its output connected to said reset input terminal of said second flip-flop; and,
a fourth logic gate having its inputs connected to said second output of said second flip-flop and said output of said third gate and its input connected to said reset input terminal of said third flip-flop.

8. The pulse stretcher recited in claim 7 further comprising a steered flip-flop having a set input connected to said first output of said third flip-flop, a reset input connected to said second output of said third flip-flop and a trigger input connected to said synchronous pulse source.

9. The pulse stretcher recited in claim 7 wherein said asynchronous pulse source comprises a delay line.

10. A serial data storage and processing system comprising:
an asynchronous circulating storage unit,
a source of recurrent clock pulses,
means for circulating first and second data pulses in said circulating storage unit,
the leading edge of said first pulse occurring after the leading edge of a first one of said clock pulses and a trailing edge occurring before the leading edge of a second one of said clock pulses, the leading edge of said second data pulse occurring after the leading edge of a second one of said clock pulses and the trailing edge occurring before the leading edge of a third one of said clock pulses,
means responsive to the time of occurrence of the leading edge of said first data pulse to provide the leading edge of a modified first data pulse and to the trailing edge of said second one of said clock pulses to provide the trailing edge of said modified first data pulse,
means responsive to the time of occurrence of the leading edge of said second data pulse to provide the leading edge of a modified second data pulse and to the trailing edge of said third one of said clock pulses to provide the trailing edge of the modified second data pulse, means responsive to the leading edge of said second data pulse occurring during the response of said first mentioned responsive means to said first data pulse for storing said second data pulse until the occurrence of the trailing edge of said second one of said clock pulses,
means responsive to the leading edge of said modified first data pulse and the trailing edge of said second one of said clock pulses to provide the leading edge of a delayed first data pulse,
means responsive to the trailing edge of said third one of said clock pulses to provide the trailing edge of said delayed first data pulse,
means responsive to the leading edge of said stored second data pulse and the trailing edge of said third one of said clock pulses to provide the leading edge of a delayed second data pulse,
means responsive to the trailing edge of a fourth one of said clock pulses to provide the trailing edge of said delayed second data pulse,
means for processing said delayed first and second pulses to provide processed pulses, and means for circulating said processed pulses in said circulating storage unit.

11. A serial data storage and processing system comprising:
a circulating storage unit,
a source of recurrent clock signals,
means for circulating data pulses in said circulating storage unit, each said data pulse occurring between the leading edges of a preceding and a succeeding clock signal,
means responsive to each data pulse to provide a modified data pulse at a subsequent period wherein the edge of said modified data pulse occurs at the trailing edge of the succeeding clock pulse and the trailing edge of said modified data pulse occurs at the trailing edge of the next clock pulse following the succeeding clock pulse, and means responsive to a data pulse occurring during the subsequent period associated with a previous date pulse to effectively delay said data pulse beyond said subsequent period before providing a modified data pulse thereof, means for processing said modified pulses and means for circulating said processed pulses in said circulating storage unit.